(12) United States Patent
Iwamoto et al.

(10) Patent No.: US 8,846,245 B2
(45) Date of Patent: Sep. 30, 2014

(54) INSULATABLE BATTERY PACK FOR SECONDARY BATTERY

(75) Inventors: Kazuya Iwamoto, Osaka (JP); Taisuke Yamamoto, Nara (JP)

(73) Assignee: Panasonic Corporation, Osaka (JP)

( * ) Notice: Subject to any disclaimer, the term of this patent is extended or adjusted under 35 U.S.C. 154(b) by 193 days.

(21) Appl. No.: 13/061,801

(22) PCT Filed: Aug. 31, 2009

(86) PCT No.: PCT/JP2009/004265
§ 371 (c)(1),
(2), (4) Date: Mar. 2, 2011

(87) PCT Pub. No.: WO2010/026731
PCT Pub. Date: Mar. 11, 2010

(65) Prior Publication Data
US 2011/0165454 A1    Jul. 7, 2011

(30) Foreign Application Priority Data

Sep. 5, 2008 (JP) ................. 2008-228965

(51) Int. Cl.
*H01M 2/00* (2006.01)
*H01M 10/658* (2014.01)
*H01M 2/10* (2006.01)
*H01M 10/052* (2010.01)

(52) U.S. Cl.
CPC ........ *H01M 10/5087* (2013.01); *H01M 2/1094* (2013.01); *H01M 2/1016* (2013.01); *Y02E 60/12* (2013.01); *H01M 10/052* (2013.01)
USPC ....................................... 429/163

(58) Field of Classification Search
USPC ......... 429/149, 153, 163, 176, 175, 174, 177, 429/99
See application file for complete search history.

(56) References Cited

U.S. PATENT DOCUMENTS 3,711,332 A * 1/1973 Bastacky ............... 429/136
4,751,155 A   6/1988 Binder et al.
(Continued)

FOREIGN PATENT DOCUMENTS

| CN | 1147489 A | 4/1997 |
|----|-----------|--------|
| EP | 1 168 468 A1 | 1/2002 |

(Continued)

OTHER PUBLICATIONS

Chinese Office Action issued in Chinese Patent Application No. 200980134472.3 mailed on Mar. 4, 2013.
(Continued)

*Primary Examiner* — Raymond Alejandro
(74) *Attorney, Agent, or Firm* — McDermott Will & Emery LLP (57) ABSTRACT

A battery pack is provided, which includes a secondary battery; a molded body configured to store therein the secondary battery; and a foamable layer provided between the secondary battery and an inner surface of the molded body and configured to foam at a predetermined temperature or higher to form a foam heat insulating layer. With this, a heat insulating layer contained in the battery pack is thin in a normal state where the battery is not generating heat, and the heat insulating layer exerts a high heat insulating effect at the time of malfunction to suppress the temperature increase of a surface of the battery pack.

9 Claims, 2 Drawing Sheets

(56) References Cited

U.S. PATENT DOCUMENTS

| | | |
|---|---|---|
| 5,607,787 A | 3/1997 | Wedlake et al. |
| 5,626,982 A | 5/1997 | Kawai et al. |
| 2007/0259258 A1 | 11/2007 | Buck |

FOREIGN PATENT DOCUMENTS

| | | | |
|---|---|---|---|
| GB | 2046502 | * 11/1980 | ............ H01M 10/39 |
| GB | 2121159 A | 12/1983 | |
| JP | 50-147544 A | 11/1975 | |
| JP | 62-150649 | 7/1987 | |
| JP | 64-71059 | 3/1989 | |
| JP | 04-162347 | 6/1992 | |
| JP | 05-043822 | 2/1993 | |
| JP | 05-234573 | 9/1993 | |
| JP | 6-349521 | 12/1994 | |
| JP | 10-046015 | 2/1998 | |
| JP | 2000-30739 | 1/2000 | |
| JP | 2000-511343 | 8/2000 | |
| JP | 2000-251853 | 9/2000 | |
| JP | 2000-294203 | 10/2000 | |
| JP | 3408676 | 3/2003 | |
| JP | 2003-346754 | 12/2003 | |
| JP | 2004-228047 | 8/2004 | |
| JP | 2004-259613 A | 9/2004 | |
| JP | 2008-004506 | 1/2008 | |
| JP | 2008-159559 A | 7/2008 | |
| JP | 2008-192342 | 8/2008 | |
| WO | WO 97/45884 | 12/1997 | |
| WO | WO 01/45185 A1 | 6/2001 | |
| WO | WO-2008/078948 A1 | 7/2008 | |

OTHER PUBLICATIONS

Hoffman, Herbert, I.: "Sodium Silicate as a Versatile Structural Material", 1965 Aerospace Expandable Structures Conference Transactions; Minneapolis (Minnesota), May 27, 1965, pp. 289-303, XP002719073, Retrieved from the Internet URL:http://contrails.iit.edu/DigitalCollection/1965/AFAPLTR65-108article14.pdf.

Extended European Search Report issued in Corresponding European Application No. 09811261.8, dated Mar. 3, 2014.

Chinese Search Report issued in corresponding Chinese Application No. 200980134472.3, dated Apr. 1, 2014, with English translation.

* cited by examiner

INSULATABLE BATTERY PACK FOR SECONDARY BATTERY

RELATED APPLICATIONS

This application is the U.S. National Phase under 35 U.S.C. §371 of International Application No. PCT/JP2009/004265, filed on Aug. 31, 2009, which in turn claims the benefit of Japanese Application No. 2008-228965, filed on Sep. 5, 2008, the disclosures of which Applications are incorporated by reference herein.

TECHNICAL FIELD

The present invention relates to a battery pack configured such that a secondary battery is stored in a container.

BACKGROUND ART

In recent years, due to the spread of portable devices, such as notebook computers and mobile phones, there is an increasing demand for batteries that are power supplies of the portable devices. Especially, there is an increasing demand for secondary batteries which are small in size, light in weight, high in energy density, and repeatedly rechargeable. As such battery, a lithium ion secondary battery using a nonaqueous solvent as an electrolytic solution has been intensely researched and developed.

In accordance with the increase in function of the portable devices, the energy of the lithium ion secondary battery is increasing. In proportion to this, the amount of heat which may be generated at the time of a potential malfunction is also increasing.

For ease of handleability, such secondary battery is stored in a resin container and sold as a battery pack. Used as an exterior container constituting the battery pack is a container (see PTL 1, for example) formed by polycarbonate resin mixed with a halogen-based flame retardant or a container (see PTL 2, for example) formed by a resin composition containing polyphenylene ether, styrene-based resin, and a phosphoester-based flame retardant.

In order to further increase the flame retardancy of the above resin composition, proposed is to mix the resin composition with inorganic hydroxide, such as magnesium hydroxide ($Mg(OH)_2$), aluminum hydroxide ($Al(OH)_3$), or dawsonite ($NaAl(OH)_2CO_3$) (see paragraph 0023 in PTL 2, for example). When each of the magnesium hydroxide and the aluminum hydroxide is heated, it absorbs ambient heat and discharges water ($H_2O$). Therefore, combustion heat is reduced by this heat absorbing action. Thus, a flame-retardant effect can be exerted.

As another method for suppressing the temperature increase of the surface of the battery pack by utilizing the heat absorbing action when the malfunction has occurred, proposed is a method for introducing a polymeric material in the battery pack to utilize melting latent heat generated when the polymeric material melts (see PTL 3, for example).

Moreover, to prevent moisture from intruding from the outside, proposed as an exterior material of the battery pack is a stack body formed by stacking an exterior resin layer, a metal layer, and an inner resin layer in this order (see PTL 4, for example).

Proposed is that in a vacuum heat-insulating container configured to store a plurality of sodium-sulfur unit cells, to prevent a second accident caused by reaction heat generated at the time of break of the unit cell, granular fireproofing agents, such as fire extinguishing sands or lightweight aggregates, are filled in the container or a heat insulating board made of glass wool or ceramic wool is used in the container (see PTL 5, for example).

CITATION LIST

Patent Literature

PTL 1: Japanese Laid-Open Patent Application Publication No. 10-46015
PTL 2: Japanese Patent No. 3408676
PTL 3: Japanese Laid-Open Patent Application Publication No. 2004-228047
PTL 4: Japanese Laid-Open Patent Application Publication No. 2008-4506
PTL 5: Japanese Laid-Open Patent Application Publication No. 2000-30739

SUMMARY OF INVENTION

Technical Problem

Since the capacity of the battery stored in the battery pack is increasing in recent years, the internal temperature of the battery pack may become higher than that of the conventional battery pack when the battery has caused abnormal heat generation for some reason.

In a case where a common heat insulating member is incorporated in a battery container as in PTL 5 to prevent the internal temperature from spreading to the outside of the container, the thickness of the heat insulating layer necessary for securing an adequate heat insulating effect becomes extremely large, so that the size of the battery pack becomes large.

For example, the heat insulating member shown in PTL 5 is designed to shield the heat by its low heat conductivity and thickness, and the purpose thereof is to insulate the heat at all times. Therefore, many of the heat insulating members are thick, that is, have several millimeters to tens of centimeters in thickness. If such heat insulating layer is used in the battery pack, the volume of the heat insulating member in the battery pack becomes extremely large, and this decreases the energy density of the entire battery pack. In accordance with simulations by the present inventors, in the case of using a conventional heat insulating member (glass wool, heat conductivity of 0.05 W/m·K) to maintain the temperature of an outer surface of the battery pack at 400° C. or lower in the battery pack having the internal temperature of 1200° C., the thickness of the heat insulating layer needs to be about 14 mm.

The present invention was made to solve the above problems, and an object of the present invention is to provide a battery pack configured such that: a heat insulating layer contained in the battery pack is thin in a normal state where a battery contained in the battery pack is not generating heat; and the heat insulating layer exerts a high heat insulating effect at the time of malfunction to suppress a temperature increase of a surface of the battery pack.

Solution to Problem

In order to solve the above problems, the present invention is a battery pack including: a secondary battery; a molded body configured to store therein the secondary battery; and a foamable layer provided between the secondary battery and an inner surface of the molded body and configured to foam at a predetermined temperature or higher to form a foam heat insulating layer.

In the present invention, the battery pack denotes a battery pack configured such that for ease of handleability of the secondary battery, one or a plurality of secondary battery elements, especially a plurality of secondary battery elements, are stored in a container together with a predetermined circuit.

Moreover, the foamable layer of the present invention is a layer which contains a foamable component, can start foaming to form the foam heat insulating layer when the inside of the battery pack has reached a predetermined temperature, and is not yet foaming. Here, the predetermined temperature is not a temperature which may be reached when the battery pack is normally used but a temperature which may be reached when the abnormal heat generation has occurred in the battery in the battery pack. The predetermined temperature may be suitably set in accordance with the performance of the battery. For example, the predetermined temperature may be about 110° C. Moreover, the foam heat insulating layer is a layer formed such that a foaming process proceeds in the foamable layer. The foam heat insulating layer is thicker than the foamable layer, contains air bubbles therein, and has a heat insulating property.

With the above configuration, when the abnormal heat generation of the secondary battery in the battery pack occurs, the foamable layer foams and expands to form the foam heat insulating layer. The foam heat insulating layer contains the air bubbles therein and is thicker than the foamable layer. Thus, the foam heat insulating layer provides the heat insulating performance. Therefore, the foamable layer contained in the battery pack is thin in a normal state, but the foamable layer expands and contains the air bubbles at the time of the abnormal heat generation. Thus, the adequate heat insulating performance can be provided.

It is preferable that the material of the foamable layer be a material resistant to heat at the time of abnormal heat generation, and it is especially preferable that the material of the foamable layer be an inorganic material. A specific example of the material which foams by exposure to high temperature is silicate of alkali metal. The silicate of the alkali metal is often industrially used as an inorganic adhesive. Examples of the alkali metal are sodium, potassium, and lithium.

Regarding the silicate of the alkali metal, from a viewpoint of binding strength, sodium is higher than potassium, and potassium is higher than lithium. Moreover, from a viewpoint of water resistance, lithium is higher than potassium, and potassium is higher than sodium. Depending on desired characteristics, these silicates of the alkali metals may be used alone or in combination.

The silicate of the alkali metal contains a large amount of crystal water. When the solidified silicate of the alkali metal is exposed to high temperature, it starts discharging the crystal water at about 110° C. and starts foaming at the same time. Thus, the foamable layer changes into the foam heat insulating layer and increases in thickness. Since a large number of air bubbles are formed in the layer at this time, the heat insulating property improves. Further, an effect of cooling down the system is obtained by latent heat generated when the crystal water is discharged. Moreover, such silicate is an incombustible material which does not have an ignition point or an flash point, so that it is preferable to improve the reliability of the battery pack.

The battery pack of the present invention may further include a block layer provided between the secondary battery and the foamable layer to block leakage from the secondary battery.

Even if the leakage, such as gas, flame, molten alkali salt, or electrolytic solution, from the secondary battery occurs, it is possible to prevent the leakage from flowing out to the outside of the battery pack by providing the block layer in the battery pack. Further, by providing the block layer on an inner side of the foamable layer, the foamable layer or the foam heat insulating layer does not directly contact the leakage, such as the molten alkali salt. Therefore, it is possible to avoid the loss of the heat insulating performance by the reaction between the foamable layer and the leakage or between the foam heat insulating layer and the leakage. With this, even if the molten alkali salt leaks from the battery, the temperature increase of the surface of the battery pack can be suppressed.

It is preferable that the block layer of the present invention be formed by a material resistant to the molten alkali salt in order that the molten material of the alkali salt, such as especially lithium orthosilicate or lithium stannate, can be prevented from flowing out to the outside of the battery pack. The material resistant to the molten alkali salt is preferably a material which does not melt or react by contact with the molten alkali salt so that a hole is not formed on the block layer. To be specific, it is desirable that the material have an adequately high melting point (which is at least higher than the melting point of the alkali salt) and do not have reactivity with the molten alkali salt. Examples of such material are preferably metals. Among the metals, iron, titanium, zirconium, vanadium, niobium, molybdenum, tantalum, tungsten, titanium nitride, or stainless steel is preferable. Further, iron, vanadium, niobium, molybdenum, tantalum, tungsten, titanium nitride, or stainless steel is more preferable.

Advantageous Effects of Invention

In accordance with the battery pack of the present invention, the heat insulating layer contained in the battery pack is thin in a normal state where the battery contained in the battery pack is not generating heat, so that the energy density of the entire battery pack can be improved. Further, at the time of malfunction, the heat insulating layer can exert the high heat insulating effect to suppress the temperature increase of the surface of the battery pack.

DESCRIPTION OF EMBODIMENTS

Hereinafter, embodiments of the present invention will be explained in reference to the drawings.

Embodiment 1

Figure 1:
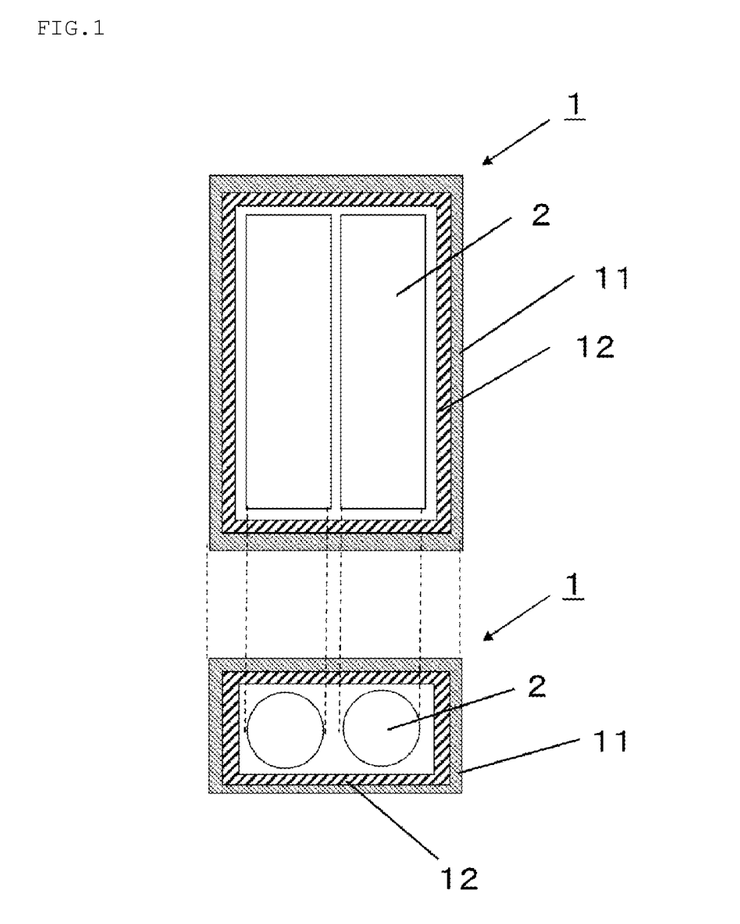
FIG. 1 is a configuration diagram showing a cross section of a battery pack in Embodiment 1 of the present invention.

FIG. 1 is a configuration diagram showing a cross section of a battery pack 1 in Embodiment 1 of the present invention. A resin molded body 11 is formed on an outermost side of the battery pack 1. A foamable layer 12 formed by an inorganic material is provided so as to contact an inner wall of the resin molded body 11. A plurality of rechargeable secondary batteries 2 are stored in this two-layer structure to constitute the battery pack 1.

The secondary battery 2 is a lithium secondary battery configured such that: used as an active material of a negative electrode thereof is silicon, tin, an alloy of silicon or tin, or an oxide of silicon or tin; and used as an active material of a positive electrode thereof is lithium-containing transition metal oxide, such as lithium cobalt oxide or lithium nickel oxide. Moreover, as the negative electrode, a carbon material, such as graphite, may be used instead of silicon or tin. An electrolytic solution contained in the secondary battery contains an organic solvent, such as ethylene carbonate or diethyl carbonate, and lithium salt, such as lithium hexafluorophosphate.

Silicate of alkali metal is mainly used as a material of the foamable layer 12 formed only by inorganic materials. The alkali metal may be selected from sodium, potassium, and lithium.

By providing in the cup the foamable layer 12 formed by the inorganic materials, the foamable layer 12 generates air bubbles therein and expands by the heat generated at the time of malfunction of the secondary battery 2 to form a foam heat insulating layer. Therefore, the surface temperature of the battery pack 1 at the time of malfunction can be reduced.

Further, it is preferable that in addition to the silicate of the alkali metal, the foamable layer 12 include a foam promoter which discharges gas at high temperature or a structural material which maintains the shape of the foam heat insulating layer even at high temperature. Moreover, it is more preferable that the foamable layer contain both the foam promoter and the structural material.

If the foamable layer contains the foam promoter, a larger amount of gas is supplied to the inside of the layer by the discharge of the gas from the foam promoter at high temperature. Therefore, the foaming in the foamable layer can be promoted. On this account, the foam heat insulating layer can be formed to be thicker than that in a case where the foamable layer does not contain the foam promoter.

If the foamable layer contains the structural material, the foam heat insulating layer is unlikely to lose its shape even after the formation of the foam heat insulating layer containing a large number of air bubbles. Therefore, the heat insulating performance at high temperature is easily maintained.

It is preferable that each of the foam promoter and the structural material be composed of an inorganic material having high heat resistance performance. Examples of the foam promoter are aluminum hydroxide, calcium hydroxide, magnesium hydroxide, alum, sodium sulfate, calcium carbonate, magnesium carbonate, and barium carbonate. Examples of the structural material are aluminum silicate, sodium silicofluoride, bentonite, montmorillonite, kaolinite, mullite, diatomaceous earth, alumina, silica, mica, titanium oxide, vermiculite, pearlite, maglite, sepiolite, talc, calcium silicate, magnesium silicate, calcium sulfate, and cement. These inorganic materials may be used alone or in combination.

It is preferable that selected as a material of the foam promoter be a material which discharges gas at a temperature higher than a temperature at which a foaming process proceeds inside the layer by the discharge of crystal water from the silicate of the alkali metal.

Specifically, it is preferable that aluminum hydroxide or magnesium hydroxide be used as the foam promoter when sodium silicate is used as the silicate of the alkali metal. Although the sodium silicate discharges the crystal water in a range from about 130 to 150° C. and the foaming proceeds, the aluminum hydroxide discharges the gas at about 200 to 300° C., and the magnesium hydroxide discharges the gas at about 400° C. or higher. In the case of this combination, since the aluminum hydroxide or the magnesium hydroxide as the foam promoter discharges the gas at a temperature higher than the temperature at which the sodium silicate discharges the gas, the foaming process can be continued up to high temperature.

The amounts of the silicate of the alkali metal, the foam promoter, and the structural material contained in the foamable layer can be suitably set in consideration of the heat insulating performance, a foaming temperature, the strength of the foam heat insulating layer, and the like. The foamable layer containing 50 to 70 weight % of the silicate of the alkali metal, 5 to 30 weight % of the foam promoter, and 20 to 40 weight % of the structural material is preferable since a performance balance thereof is excellent.

Method for Manufacturing Battery Pack 1

The battery pack 1 according to Embodiment 1 has the configuration shown in FIG. 1 and can be manufactured by the following steps.

Step (A): A step of forming the molded body 11 having an accommodating space therein such that the rechargeable secondary battery 2 can be stored in the accommodating space.

Step (B): A step of preparing a paste by kneading the silicate of the alkali metal, the foam promoter and/or the structural material according to need, and water.

Step (C): A step of applying the paste to the inner wall of the molded body and drying the paste to form the foamable layer 12.

Step (D): A step of storing the secondary battery 2 on an inner surface side of the foamable layer 12.

First, in Step (A), the molded body 11 for storing the secondary battery 2 is formed by using resin. As described in "A Guide to the Safe Use of Secondary Lithium Ion Batteries in Notebook-type Personal Computers" (Japan Electronics and Information Technology Industries Association, Battery Association of Japan), the resin molded body 11 is preferably a molded body formed by molding flame-retardant resin of V-0 or higher of UL-94 standard. Specifically, a flame-retardant resin composition can be used, which is subjected to flameproofing by mixing polycarbonate (PC), polypropylene (PP), or polyethylene terephthalate (PET) with a flame retardant. A method for molding the molded body 11 is not especially limited, and a known method is applicable.

Next, in Step (B), the paste is prepared by kneading the water and the silicate of the alkali metal that is a foamable component. At this time, the foam promoter and/or the structural material can be added in addition to the silicate of the alkali metal. The viscosity of the paste is adjusted by, for example, suitably adjusting the amount of water such that the paste is suitable for the application.

Then, in Step (C), the paste is applied to the inner wall of the molded body 11 and dried to form the foamable layer 12 formed by the inorganic materials.

Lastly, in Step (D), the secondary battery 2 is stored on the inner surface side of the foamable layer 12 to manufacture the battery pack 1. An opening of the molded body 11 can be suitably sealed after the secondary battery 2 is stored.

Embodiment 2

In accordance with the increase in capacity and energy density of the battery in recent years, used as the negative electrode of the lithium secondary battery instead of the graphite is silicon, tin, an alloy of silicon or tin, or an oxide of silicon or tin, each of which potentially has an extremely large capacity.

If the malfunction of such lithium secondary battery occurs, lithium orthosilicate or lithium stannate generated by the reaction between a material of the negative electrode and lithium may leak as high-temperature molten alkali salt from the secondary battery. Such molten alkali salt is extremely high in temperature and also high in reactivity. Therefore, if the molten alkali salt having leaked from the secondary battery reacts with the foamable layer or the foam heat insulating layer, the heat insulating effect of the foam heat insulating layer may not be adequately exerted. Further, if the molten alkali salt having leaked from the secondary battery reacts with the molded body, the molten alkali salt may leak to the outside of the battery pack.

Figure 2:
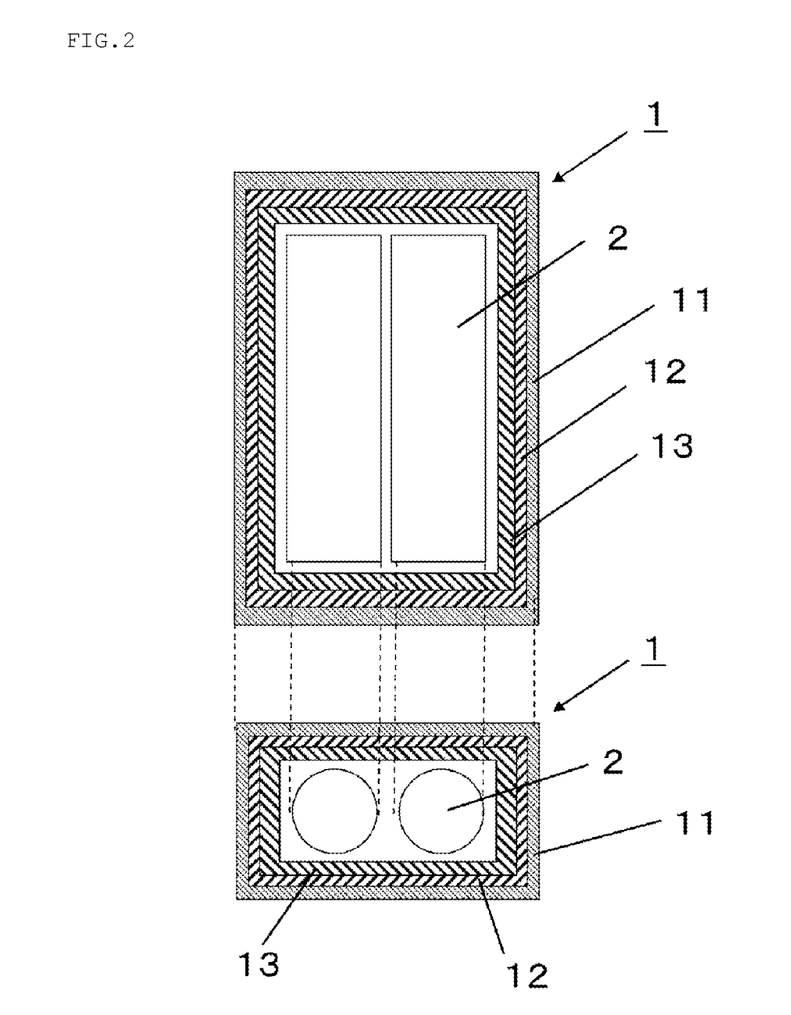
FIG. 2 is a configuration diagram showing a cross section of the battery pack in Embodiment 2 of the present invention.

Here, in the battery pack 1 according to Embodiment 2, as shown in FIG. 2, a block layer 13 is further provided so as to contact an inner surface of the foamable layer 12 of Embodiment 1. A plurality of secondary batteries 2 are stored in this three-layer structure to manufacture the battery pack 1. Embodiment 2 is the same as Embodiment 1 except for the block layer 13, so that an explanation thereof is omitted.

Even if the molten alkali salt leaks from the secondary battery, the leakage is prevented from flowing out to the outside of the battery pack by providing the block layer 13 in the battery pack. Further, by providing the block layer 13 on an inner side of the foamable layer 12, the foamable layer or the foam heat insulating layer formed by the foaming and expansion of the foamable layer does not directly contact the molten alkali salt. Therefore, it is possible to avoid the loss of the heat insulating performance by the reaction between the foamable layer and the molten alkali salt or between the foam heat insulating layer and the molten alkali salt. With this, even in a case where silicon, tin, an alloy of silicon or tin, or an oxide of silicon or tin is used as the active material of the negative electrode of the secondary battery 2 and the molten alkali salt has leaked from the secondary battery, the temperature increase of the surface of the battery pack can be suppressed.

Even in the battery pack 1 storing the secondary battery 2 using graphite as the active material of the negative electrode thereof, flame from the graphite at the time of malfunction is prevented from directly contacting the foamable layer or the foam heat insulating layer by providing the block layer 13. Therefore, the heat insulating effect that is higher in level than that of Embodiment 1 can be achieved in Embodiment 2.

PTL 4 proposes a battery pack in which to prevent moisture from permeating the battery pack, a material, such as aluminium, stainless steel, titanium, copper, or iron plated by any one of tin, zinc, and nickel, is inserted. In this battery pack, provided as a layer closest to the secondary battery is a resin layer formed by at least one resin material selected from the group consisting of polyethylene, polypropylene, ethylene vinyl acetate copolymer, ethylene vinyl acetate alcohol copolymer, ethylene-acrylic acid copolymer, ethylene-ethyl acrylate copolymer, ethylene-methyl acrylate copolymer, ethylene-methacrylic acid copolymer, ethylene-methyl methacrylic acid copolymer, ionomer, polyacrylonitrile, polyvinylidene chloride, polytetrafluoroethylene, polychlorotrifluoroethylene, polyphenylene ether, polyethylene terephthalate hot-melt agent, and polyamide hot-melt agent. In a case where the secondary battery using silicon, tin, an alloy of silicon or tin, or an oxide of silicon or tin as the negative electrode is stored in the battery pack configured as above, the molten alkali salt leaking from the secondary battery at the time of the malfunction first contacts the resin layer, so that the resin layer may burn and this may further increase burning energy.

In a preferred mode of the present invention, the block layer 13 is provided at a position closest to the secondary battery 2, so that the possibility of burning in the battery pack 1 can be reduced, and the temperature increase by the burning can be suppressed.

Method for Manufacturing Battery Pack 1

The battery pack 1 according to Embodiment 2 has the configuration shown in FIG. 2 and can be manufactured by the following steps.

Step (A): A step of forming the molded body 11 having an accommodating space therein such that the rechargeable secondary battery 2 can be stored in the accommodating space.

Step (B): A step of preparing a paste by kneading the silicate of the alkali metal, the foam promoter and/or the structural material according to need, and water.

Step (C): A step of applying the paste to the inner wall of the molded body and drying the paste to form the foamable layer 12.

Step (D): A step of providing the block layer 13 on an inner surface (surface facing the accommodating space) side of the foamable layer 12, the block layer 13 being formed by the material resistant to the molten alkali salt.

Step (E): A step of storing the secondary battery 2 on an inner surface side of the block layer 13.

Steps (A) to (C) in Embodiment 2 are the same as Steps (A) to (C) in Embodiment 1, so that explanations thereof are omitted.

In Step (D), the block layer 13 formed by the material resistant to the molten alkali salt is provided on the inner surface (surface facing the accommodating space) side of the foamable layer 12 formed in Step (C) on the inner wall surface of the resin molded body 11. Specifically, a metal foil or metal plate resistant to the molten alkali salt is provided on the inner surface side of the foamable layer 12. The metal foil or the metal plate is suitably subjected to drawing in accordance with the shape of the accommodating space of the molded body 11 and is then provided. The metal foil or metal plate subjected to the drawing may have a minute gap as long as it is formed to be able to block the molten alkali salt which leaks from the secondary battery 2. However, the gap may be sealed by further carrying out welding.

A metal material used for the block layer 13 and resistant to the molten alkali salt is preferably a material which does not melt or react by contact with the molten lithium orthosilicate or the molten lithium stannate so that a hole is not formed thereon. Specifically, it is preferable to use iron, titanium, zirconium, vanadium, niobium, molybdenum, tantalum, tungsten, titanium nitride, or stainless steel, and it is more preferable to use iron, vanadium, niobium, molybdenum, tantalum, tungsten, titanium nitride, or stainless steel.

An additional layer, such as a second heat insulating layer or a heat absorbing layer, can be further provided on the inner surface side of the block layer 13. However, it is especially preferable that the block layer 13 be provided at a position closest to the secondary battery 2. To be specific, it is preferable that the additional layer be not provided on the inner surface side of the block layer 13 and a molten alkali salt-resistant layer that is the block layer 13 and the secondary battery 2 directly contact each other without the other layer interposed therebetween. With this, the molten alkali salt having leaked from the secondary battery 2 first contacts the block layer 13 and is blocked by the block layer 13. Therefore, the possibility of burning of the battery pack due to the molten alkali salt can be reduced.

Lastly, in Step (E), the secondary battery 2 is stored on the inner surface side of the block layer 13 to manufacture the battery pack 1. After the secondary battery 2 is stored, an opening of the molded body 11 can be suitably sealed.

The foregoing has explained a case where the paste for forming the foamable layer is applied to the inner wall surface of the molded body 11 in the method for manufacturing the battery pack 1 according to Embodiment 2. However, the paste may be applied to an outer wall (surface facing the outside of the battery pack) of the block layer 13.

Hereinafter, the present invention will be explained in further detail using Evaluation Examples and Test Examples. However, the present invention is not limited to Evaluation Examples and Test Examples below.

Test Example 1

Silicate soda (No. 3 produced by Osaka Keisou Co., Ltd.) was applied to the surface of a plate, 30 mm on a side, formed by polycarbonate (0.7 mm in thickness) of V-0 grade of flame retardancy standard UL94. This plate was naturally dried for a whole day and night. Thus, the foamable layer was formed on the surface of the polycarbonate plate. The dried foamable layer was 0.2 mm in thickness.

A ceramic heater (MS-M5 produced by SAKAGUCHI E.H VOC CORP.) was provided on the surface to which the silicate soda was applied. 6 V was applied to the ceramic heater, and a temperature controller was set such that the temperature of the ceramic heater became 700° C. The temperature of the surface (surface to which the silicate soda was not applied) of the polycarbonate plate and the temperature of the ceramic heater were measured by a thermocouple. When the temperature of the ceramic heater reached 115° C., the surface to which the silicate soda was applied started foaming and expanding. When the temperature of the ceramic heater reached 700° C., the foam heat insulating layer was 12 mm in thickness, and the temperature of the surface of the polycarbonate plate was 90° C. The resin did not ignite or deform.

It was found from the above results that the adequate heat insulating effect was obtained by the foamable layer having a thickness of 0.2 mm in a normal state, and the silicate soda was preferable as the material composing the battery pack 1.

Comparative Test Example 1

The same test as Test Example 1 was carried out except that the silicate soda (No. 3 produced by Osaka Keisou Co., Ltd.) was not applied. When the temperature of the ceramic heater exceeded 150° C., the polycarbonate plate started softening and significantly lost its shape.

Test Example 2

The same test as Test Example 1 was carried out except that the polycarbonate plate of Test Example 1 was replaced with a 60% magnesium hydroxide-40% polypropylene plate (hereinafter referred to as a "PP-Mg plate"). The dried foamable layer was 0.25 mm in thickness.

When the temperature of the ceramic heater reached 113° C., the surface to which the silicate soda was applied started foaming and expanding. When the temperature of the ceramic heater reached 700° C., the foam heat insulating layer was 13 mm in thickness, and the temperature of the surface of the PP-Mg plate was 76° C. The resin did not ignite or deform.

Comparative Test Example 2

The same test as Test Example 2 was carried out except that the foamable layer was not formed.

When the temperature of the ceramic heater reached 250° C., the surface of the PP-Mg plate started softening and deforming. At this time, the temperature of the surface of the PP-Mg plate was about 160° C. Further, as the temperature of the ceramic heater increased, the PP-Mg plate started discharging gas. When the temperature of the ceramic heater reached 700° C., the temperature of the surface of the PP-Mg plate was about 400° C. After a while, the PP-Mg plate ignited.

Test Example 3

The same test as Test Example 1 was carried out except that a commercially available inorganic foam heat insulating material "Accera Coat F" (produced by Access Co., Ltd., based on the silicate soda, and containing the structural material and the like) was applied instead of the silicate soda (No. 3 produced by Osaka Keisou Co., Ltd.) of Test Example 2 (in this case, the dried foamable layer was 0.5 mm in thickness). According to XRD measurement, thermal analysis by TG-DTA, and composition analysis by ICP emission spectrochemical analysis, it was estimated that Accera Coat F was composed of the following components: 61.4 weight % liquid glass No. 3, 22.2 weight % sepiolite, 8.3 weight % calcium carbonate, and 8.1 weight % titanium oxide.

When the temperature of the ceramic heater reached about 130° C., the surface to which Accera Coat F was applied foamed, and the expansion was observed. When the temperature of the ceramic heater reached 700° C., the foam heat insulating layer was 1.8 mm in thickness, and the temperature of the surface of the PP-Mg plate was 250° C. The softening and significant deformation were not observed.

It was found from the above result that the foamable layer was thin in a normal state but foamed at an abnormally high temperature to exert a high heat insulating effect, so that Accera Coat F was preferable as the material composing the battery pack 1.

Test Example 3'

Silicate soda (No. 3 produced by Osaka Keisou Co., Ltd.), sepiolite, calcium carbonate, and titanium dioxide were weighed at weight ratios of 62%, 22%, 8%, and 8%, respectively. These were adequately mixed in a planetary mixer to prepare a foamable paste. The same test as Test Example 1 was carried out except that this foamable paste was applied to the PP-Mg plate instead of Accera Coat F of Test Example 3 (the dried foamable layer was 0.5 mm in thickness).

As a result, as with Test Example 3 using Accera Coat F, when the temperature of the ceramic heater reached about 130° C., the surface to which the paste was applied started foaming, and the expansion was observed. When the temperature of the ceramic heater reached 700° C., the foam heat insulating layer was 1.9 mm in thickness, and the temperature of the surface of the PP-Mg plate was 240° C. The softening and significant deformation were not observed.

It was found from the above results that the same effect was obtained even in the case of using the paste that was the mixture of silicate soda, sepiolite, calcium carbonate, and titanium dioxide, and the paste was preferably used as the material composing the battery pack 1.

Test Example 4

A cubular container (hereinafter referred to as a "cup"), 20 mm on a side, formed by the PP-Mg plate (1 mm in thickness) was produced by adhesion using a heat-resistant adhesive (Aron Ceramics E produced by Toagosei Co., Ltd.), and the silicate soda (No. 3 produced by Osaka Keisou Co., Ltd.) was applied to an inner wall of the container and dried. The dried foamable layer was 0.3 mm in thickness.

The lithium orthosilicate melted at 1450° C. was put in this cup. Then, the foamable layer foamed to form the foam heat insulating layer, and at the same time, the reaction with the molten lithium orthosilicate proceeded, and the thickness of the foam heat insulating layer was gradually decreased and finally became about 5 mm. However, the temperature of an outermost wall of the cup was decreased to about 400° C. In addition, the cup formed by the PP-Mg plate softened, but the outflow of the lithium orthosilicate was not observed.

Evaluation Example 1

First, a selection method described below was carried out to select the material resistant to the molten alkali salt as the material of the block layer 13.

First, 5 g of lithium orthosilicate ($Li_4SiO_4$ produced by CERAC) was put in a platinum crucible and was heated and melted in an electric furnace at 1450° C. under an air atmosphere.

A tablet of a material, size (diameter, thickness), and weight shown in Table 1 was put in the above melt. After the melt was heated at the above temperature for one minute, it was taken out to a stainless steel tray and cooled down. After the cooling, the solid matter was carefully broken down to take out the tablet, and the size (diameter, thickness) and weight of the tablet were measured. Table 1 shows the result.

lowing test was further carried out to evaluate the further high resistances of these metals to the molten alkali salt.

Evaluation Example 2

First, metal foils (50 μm in thickness) of respective materials were prepared. A cubular cup, 20 mm on a side, was produced from each metal foil by welding.

7 g of lithium orthosilicate was put in the platinum crucible and heated and melted in the electric furnace at 1450° C. under the air atmosphere. The melt was put in the cup in the atmosphere. After the cooling, the appearance of the cup was observed to check whether or not a hole was formed and whether or not a portion from which a molten material flowed out was formed. Table 2 shows the results.

TABLE 2

| Material | Hole | Molten Material |
|---|---|---|
| Fe | Not formed | Not flowed out |
| Ti | Formed at bottom | Flowed out |
| Zr | Formed at bottom | Flowed out |
| V | Not formed | Not flowed out |

TABLE 1

| Material | Melting Point ° C. | Before Test Diameter mm | Before Test Thickness mm | Before Test Weight g | After Test Diameter mm | After Test Thickness mm | After Test Weight g | Difference (Before minus After) Diameter mm | Difference (Before minus After) Thickness mm | Difference (Before minus After) Weight g |
|---|---|---|---|---|---|---|---|---|---|---|
| Fe | 1536 | 10.006 | 4.958 | 3.029 | 10.464 | 5.126 | 3.003 | −0.485 | −0.168 | 0.026 |
| Ti | 1668 | 10.173 | 5.065 | 1.808 | 10.159 | 5.227 | 1.792 | 0.014 | −0.162 | 0.016 |
| $SiO_2$ | 1730 | 10.011 | 5.020 | 0.867 | 8.494 | 4.667 | 0.495 | 1.517 | 0.356 | 0.372 |
| $TiO_2$ | 1840 | 10.009 | 5.371 | 1.547 | Completely Melted | | | | | |
| Zr | 1852 | 10.002 | 5.111 | 2.609 | 10.151 | 5.432 | 2.623 | −0.149 | −0.321 | −0.014 |
| V | 1900 | 9.987 | 3.217 | 1.464 | 10.093 | 3.428 | 1.455 | −0.106 | −0.211 | 0.009 |
| Nb | 2468 | 10.143 | 5.152 | 3.479 | 10.196 | 5.483 | 3.447 | −0.053 | −0.331 | 0.032 |
| Mo | 2610 | 9.928 | 5.060 | 3.980 | 10.146 | 5.095 | 3.931 | −0.218 | −0.035 | 0.049 |
| $ZrO_2$ | 2720 | 10.017 | 4.986 | 0.946 | 10.059 | 4.995 | 0.933 | −0.042 | −0.009 | 0.013 |
| MgO | 2830 | 10.004 | 5.086 | 1.363 | 10.249 | 5.197 | 1.245 | −0.245 | −0.111 | 0.118 |
| Ta | 2996 | 10.008 | 5.143 | 6.694 | 10.281 | 5.452 | 6.627 | −0.273 | −0.309 | 0.067 |
| TiN | 3290 | 10.005 | 5.124 | 1.969 | 10.027 | 5.141 | 1.950 | −0.022 | −0.017 | 0.019 |
| W | 3387 | 9.994 | 5.167 | 7.732 | 10.017 | 5.274 | 7.638 | −0.023 | −0.107 | 0.094 |
| TaC | 3980 | 10.272 | 5.018 | 3.273 | Crushed | | | | | |

In the case of $TiO_2$, the tablet was not found in the cooled solid matter and was thought to completely react with the molten lithium orthosilicate to be disappeared.

In the case of TaC, a pellet was crushed as soon as it was put in a high-temperature electric furnace, and the shape of the pellet could not be maintained.

In the case of $SiO_2$, it was found that the diameter, thickness, and weight of the tablet were apparently decreased, and $SiO_2$ reacted with the molten lithium orthosilicate.

In the case of the other materials, the size after the test became larger than that before the test. It was thought that this change in size was caused by the expansion of the air in the tablet. Regarding the change in weight measured as above, the weight was not significantly decreased. Therefore, it was found that metals resistant to the molten alkali salt were iron, titanium, zirconium, vanadium, niobium, molybdenum, zirconium oxide, magnesium oxide, tantalum, tungsten, and titanium nitride.

Among these metals selected in the above first selection, materials which were comparatively easily processed and easily tested as a metal foil (plate) were Fe, Ti, Zr, V, Nb, Mo, Ta, W, and TiN, and a material which was an iron-based material and high in versatility was stainless steel. The fol- TABLE 2-continued

| Material | Hole | Molten Material |
|---|---|---|
| Nb | Not formed | Not flowed out |
| Mo | Not formed | Not flowed out |
| Ta | Not formed | Not flowed out |
| W | Not formed | Not flowed out |
| TiN | Not formed | Not flowed out |
| Stainless Steel | Not formed | Not flowed out |

In the case of the cup made of Ti or Zr, it was observed that the bottom of the cup melted, a large hole was formed, and the molten material flowed out from the hole.

It was found from the above results that among the metal materials tested as above, iron, vanadium, niobium, molybdenum, tantalum, tungsten, titanium nitride, and stainless steel were excellent in resistance to the molten alkali salt.

Test Example 5

In Test Example 5, the block layer formed by the material resistant to the molten alkali salt was further formed on an inner side of the foamable layer of the cup produced in Test Example 4.

First, the silicate soda (No. 3 produced by Osaka Keisou Co., Ltd.) was applied to an inner wall of each of cubular cups (20 mm on a side) formed by the PP-Mg plates and dried (the dried foamable layer was 0.3 mm in thickness). The cups produced by respectively using the metal materials (stainless steel, iron, vanadium, niobium, molybdenum, tantalum, tungsten, and titanium nitride) selected in Evaluation Example (each material was 40 μm in thickness) were respectively inserted in the cubular cups. Thus, three-layer-structure cups were produced.

After the lithium orthosilicate melted at 1450° C. was put in the cup, whether or not the melt flowed out was checked, and the temperature of the outermost wall was detected.

In the case of any cup, the outflow of the lithium orthosilicate was not observed, and the temperature of the outermost wall of the cup was suppressed to 100° C. or lower.

Comparative Test Example 3

A cubular cup formed by the PP-Mg plate (1 mm in thickness) was produced, and the molten lithium orthosilicate was directly put in this cup. The PP-Mg plate melted, and the molten lithium orthosilicate flowed out.

Comparative Test Example 4

A cubular cup formed by the PP-Mg plate (1 mm in thickness) was produced, and a cup of SUS304 (40 μm in thickness) was inserted in the cubular cup. Thus, a two-layer-structure cup was produced.

The molten lithium orthosilicate was put in the two-layer-structure cup. The PP-Mg plate softened, deformed, generated white smoke, and ignited. However, the molten lithium orthosilicate did not flow out.

Test Example 6

A cubular cup, 20 mm on a side, was produced by using the PP-Mg plate (1 mm in thickness). A commercially available inorganic foam fireproof heat insulating material "Accera Coat F" (produced by Access Co., Ltd., based on the silicate soda, and containing the structural material and the like) was applied to an inner side of the cubular cup (the dried foamable layer was 0.5 mm in thickness). Thus, a two-layer-structure cup was produced. After the lithium orthosilicate melted at 1450° C. was put in the cup, whether or not the melt flowed out was checked, and the temperature of the outermost wall was detected.

As a result, the foamable layer formed by Accera Coat F foamed to form the foam heat insulating layer, and at the same time, the reaction with the molten lithium orthosilicate proceeded, and the thickness of the foam heat insulating layer was gradually decreased and finally became about 4 mm. However, the temperature of the outermost wall of the cup was decreased to about 400° C. The cup formed by the PP-Mg plate softened, but the outflow of the lithium orthosilicate was not observed.

Test Example 7

A cubular cup, 20 mm on a side, was produced by using the PP-Mg plate (1 mm in thickness). The commercially available inorganic foam fireproof heat insulating material "Accera Coat F" (produced by Access Co., Ltd., based on the silicate soda, and containing the structural material and the like) was applied to an inner side of the cubular cup (the dried foamable layer was 0.5 mm in thickness). Further, a cup of SUS304 (40 μm in thickness) was inserted in the cubular cup. Thus, a three-layer-structure cup was produced. After the lithium orthosilicate melted at 1450° C. was put in the cup, whether or not the melt flowed out was checked, and the temperature of the outermost wall was detected.

As a result, the outflow of the lithium orthosilicate was not observed, and the temperature of the outermost wall of the cup was suppressed to 350° C. or lower. The PP-Mg did not ignite or significantly deform. At this time, the foam heat insulating layer was about 7 mm in thickness.

It was found from Test Examples 1 to 3 and Comparative Test Examples 1 and 2 that when high heat was generated in the battery pack, the temperature of the outer surface of the molded body was suppressed to a low level and the ignition and deformation of the resin forming the molded body were suppressed by providing the foamable layer on the inner side of the molded body.

It was found from the above results that the foamable layer was thin in a normal state, but it foamed at an abnormally high temperature to exert a high heat insulating effect, so that it is preferable as the material composing the battery pack.

Further, it was found from Test Examples 4 to 7 and Comparative Test Examples 3 and 4 that even if the highly-reactive high-temperature material, such as the molten lithium orthosilicate, leaked from the secondary battery to the inside of the battery pack, the heat insulating effect of the foam heat insulating layer was maintained, the temperature of the outer surface of the molded body was further reduced, and the softening of the resin forming the molded body was suppressed by further providing the block layer on the inner side of the foamable layer.

INDUSTRIAL APPLICABILITY

In accordance with the battery pack of the present invention, even if the secondary battery causes abnormal heat generation, the heat insulating effect is exerted to suppress the temperature increase of the surface of the battery pack. In addition, the heat insulating layer contained in the battery pack is thin in a normal state, and the energy density of the entire battery pack can be maintained at a high level. The present invention is preferably applicable to a case where the electrode active material of the negative electrode of the secondary battery is silicon, tin, an alloy of silicon or tin, or an oxide of silicon or tin. Therefore, the battery pack of the present invention can be preferably used as a PC battery pack, a mobile phone battery pack, or the like. In addition, the present invention is also applicable to a packaged large-size stationary battery, an electric car battery, or the like.

REFERENCE SIGNS LIST

1 battery pack
2 secondary battery
11 resin molded body
12 foamable layer
13 block layer

The invention claimed is:
1. A battery pack comprising:
a secondary battery;
a molded body configured to store therein the secondary battery; and
a foamable layer provided around an outer surface of the secondary battery and directly on an inner surface of the molded body and configured to foam at a temperature higher than a normal operating temperature of the secondary battery to form a foam heat insulating layer; and
a block layer provided between the secondary battery and the foamable layer to block leakage from the secondary battery, wherein the foamable layer contains sili- cate of alkali metal, the alkali metal is sodium, and the block layer comprises a different material than the foamable layer.

2. The battery pack according to claim 1, wherein the foamable layer further contains a foam promoter and a structural material.

3. The battery pack according to claim 2, wherein the foam promoter contains at least one selected from the group consisting of aluminum hydroxide, calcium hydroxide, magnesium hydroxide, alum, sodium sulfate, calcium carbonate, magnesium carbonate, and barium carbonate.

4. The battery pack according to claim 2, wherein the structural material contains at least one selected from the group consisting of aluminum silicate, sodium silicofluoride, bentonite, montmorillonite, kaolinite, mullite, diatomaceous earth, alumina, silica, mica, titanium oxide, vermiculite, pearlite, maglite, sepiolite, talc, calcium silicate, magnesium silicate, and calcium sulfate.

5. The battery pack according to claim 2, wherein a temperature at which the foam promoter discharges gas is higher than a temperature at which the silicate of the alkali metal foams.

6. The battery pack according to claim 1, wherein the block layer is formed by a material resistant to molten alkali salt.

7. The battery pack according to claim 6, wherein the material resistant to the molten alkali salt contains iron, titanium, zirconium, vanadium, niobium, molybdenum, tantalum, tungsten, titanium nitride, or stainless steel.

8. The battery pack according to claim 1, wherein a negative electrode of the secondary battery contains silicon, tin, an alloy of silicon or tin, or an oxide of silicon or tin.

9. The battery pack according to claim 1, further comprising:
a plurality of secondary batteries;
a molded body configured to store therein the secondary batteries; and
a foamable layer provided around an outer surface of the secondary batteries and directly on an inner surface of the molded body and configured to foam at a temperature higher than a normal operating temperature of the secondary batteries to form a foam heat insulating layer.

* * * * *